(12) United States Patent
Li et al.

(10) Patent No.: US 10,166,513 B2
(45) Date of Patent: Jan. 1, 2019

(54) SPACER FOR A MEMBRANE MODULE

(71) Applicant: NANYANG TECHNOLOGICAL UNIVERSITY, Singapore (SG)

(72) Inventors: Weiyi Li, Singapore (SG); Chuyang Tang, Singapore (SG); Yi-Ning Wang, Singapore (SG); William B. Krantz, Singapore (SG); Anthony Gordon Fane, Singapore (SG); Wen See Tan, Singapore (SG); Jian Yuan Lee, Singapore (SG); Jia An, Singapore (SG); Chee Kai Chua, Singapore (SG); Tzyy Haur Chong, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 0 days.

(21) Appl. No.: 15/779,026

(22) PCT Filed: Dec. 6, 2016

(86) PCT No.: PCT/SG2016/050592
§ 371 (c)(1),
(2) Date: May 24, 2018

(87) PCT Pub. No.: WO2017/105345
PCT Pub. Date: Jun. 22, 2017

(65) Prior Publication Data
US 2018/0345224 A1 Dec. 6, 2018

(30) Foreign Application Priority Data
Jul. 7, 2016 (SG) .......................... 10201605558R

(51) Int. Cl.
B01D 63/08 (2006.01)
B01D 63/10 (2006.01)
(Continued)

(52) U.S. Cl.
CPC ........... *B01D 65/08* (2013.01); *B01D 63/081* (2013.01); *B01D 63/082* (2013.01); *B01D 63/12* (2013.01);
(Continued)

(58) Field of Classification Search
None
See application file for complete search history.

(56) References Cited

U.S. PATENT DOCUMENTS

| 4,834,881 A | 5/1989 | Sawada et al. |
| 4,861,487 A | 8/1989 | Fulk, Jr. |

(Continued)

FOREIGN PATENT DOCUMENTS

WO 2017105345 A1 6/2017

OTHER PUBLICATIONS

Koutsou, c.P., S.G. Yiantsios, and AJ. Karabelas, Numerical simulation of the flow in a plane channel containing a periodic array of cylindrical turbulence promoters. Journal of Membrane Science, 2004. 231(1-2): p. 81-90.

(Continued)

*Primary Examiner* — Krishnan S Menon

(57) ABSTRACT

A spacer for a membrane module, the spacer comprising: a plurality of first filaments defining a plurality of fluid flow channels, in use the plurality of fluid flow channels being adjacent a membrane of the membrane module; and a plurality of second filaments provided on the plurality of first filaments and extending into the fluid flow channels, the second filaments moveable relative to the first filaments in response to an external stimulus during flow of fluid in the fluid flow channels.

20 Claims, 10 Drawing Sheets

(51) Int. Cl.
B01D 65/08 (2006.01)
B01D 69/06 (2006.01)
B01D 63/12 (2006.01)

(52) U.S. Cl.
CPC ........ B01D 69/06 (2013.01); *B01D 2313/086* (2013.01); *B01D 2313/143* (2013.01); *B01D 2325/40* (2013.01)

(56) References Cited

U.S. PATENT DOCUMENTS

| | | |
|---|---|---|
| 6,881,336 B2 | 4/2005 | Johnson |
| 6,968,428 B2 | 11/2005 | Maly et al. |
| 6,989,097 B2 | 1/2006 | Karode et al. |
| 7,459,082 B2 | 12/2008 | Tung et al. |
| 8,361,318 B2 | 1/2013 | Chikura et al. |
| 2003/0205520 A1 | 11/2003 | Johnson |
| 2007/0175812 A1 | 8/2007 | Chikura et al. |
| 2008/0156718 A1 | 6/2008 | Larsen |
| 2009/0078644 A1 | 3/2009 | Mues et al. |
| 2013/0146532 A1 | 6/2013 | Dontula et al. |
| 2013/0186827 A1 | 7/2013 | Farr et al. |
| 2013/0341264 A1 | 12/2013 | Kidwell |

OTHER PUBLICATIONS

Schwinge, J., et al., Spiral wound modules and spacers: Review and analysis. Journal of Membrane Science, 2004. 242(1-2): p. 129-153.
Dacosta, A.R., A.G. Fane, and D.E Wiley, Spacer characterization and pressure drop modelling in spacer-filled channels for ultrafiltration. Journal of Membrane Science, 1994. 87( I-2): p. 7998.
Schock, G. and A Miquel, Mass-transfer and pressure loss in spiral wound modules. Desalination, 1987.64: p. 339-352.
Zimmerer, C.C. and V. Kottke, Effects of spacer geometry on pressure drop, mass transfer, mixing behavior, and residence time distribution. Desalination, 1996. 104(1-2): p. 129-134.
Willems, P., et al., Use of Particle Imaging Velocimetry to measure liquid velocity profiles in liquid and liquid/gas flows through spacer filled channels. Journal of Membrane Science, 20 I O. 362(1-2): p. 143-153.
Gao, Y., et al., Characterization of fluid dynamics in spacer-filled channels for membrane filtration using Doppler optical coherence tomography. Journal of Membrane Science, 2013. 448(0): p. 198-208.
Guillen, G. and EM.V. Hoek, Modeling the impacts of feed spacer geometry on reverse osmosis and nanofiltration processes. Chemical Engineering Journal, 2009. 149(1-3): p. 221-231.
Dewan, A, et al., Review of passive heat transfer augmentation techniques. Proceedings of the Institution of Mechanical Engineers Part a—Journal of Power and Energy, 2004. 218(A7): p. 509527.
Eiamsa-Ard, S. and P. Promvonge, Enhancement of heat transfer in a tube with regularly-spaced helical tape swirl generators. Solar Energy, 2005. 78(4): p. 483-494.
Schwinge, J., De Wiley, and AG. Fane, Novel spacer design improves observed flux. Journal of Membrane Science, 2004. 229 (1-2): p. 53-61.
Balster, J., et al., Multi-layer spacer geometries with improved mass transport. Journal of Membrane Science, 2006. 282(1-2): p. 351-361.
Li, F., et al., Novel spacers for mass transfer enhancement in membrane separations. Journal of Membrane Science, 2005. 253(1-2): p. 1-12.
Amokrane, M., et al., New spacer designs for the performance improvement of the zigzag spacer configuration ill spiral-wound membrane modules. Desalination and Water Treatment, 2015.
Fimbres-Weihs, G.A., D.E. Wiley, and D.F. Fletcher, Unsteady flows with mass transfer in narrow zigzag spacer-filled channels: A numerical study. Industrial and Engineering Chemistry Research, 2006. 45(19): p. 6594-6603.

Xie, P., L.c. Murdoch, and D.A. Ladner, Hydrodynamics of sinusoidal spacers for improved reverse osmosis performance. Journal of Membrane Science. 2014. 453(0): p. 92-99.
Alben, S., M. Shelley, and 1. Zhang, Drag reduction through self-similar bending of a flexible body. Nature, 2002. 420 (6915): p. 479-481.
Steinberg, Y., Hydrodynamics—Bend and survive. Nature, 2002. 420(6915): p. 473-473.
Shelley, MJ. and J. Zhang, Flapping and Bending Bodies Interacting with Fluid Flows, in Annual Review of Fluid Mechanics, 110143, S.H. Davis al1d P. Moin, Editors. 2011. p. 449-465.
Zhu, L.D., Viscous flow past a flexible fibre tethered at its centre point: vortex shedding. Journal of Fluid Mechanics, 2007.587: p. 217-234.
Zhu, L.D., Interaction of two tandem deformable bodies in a viscous incompressible flow. Journal of Fluid Mechanics, 2009. 635: p. 455-475.
Zhu, L.D. and C.S. Peskin, Drag of a flexible fiber in a 2D moving viscous fluid. Computers & Fluids, 2007. 36(2): p. 398-406.
Taherzadeh, D., C. Picioreanu, and H. Horn, Mass Transfer Enhancement in Moving Biofilm Structures. Biophysical Journal, 2012. 102(7): p. 1483-1492.
Taherzadeh, D., et al., Computational Study of the Drag and Oscillatory Movement of Biofilm Streamers in Fast Flows. Biotechnology and Bioengineering, 2010.105(3): p. 600-610.
J. Schwinge, D. E. Wiley, A. G. Fane, and R. Guenther, "Characterization of a zigzag spacer for ultrafiltration," Journal of Membrane Science, vol. 172, pp. 19-31, 2000.
C. Fritzmann, M. Hausmann, M. Wiese, M. Wessling, and T. Melin, "Microstructured spacers for submerged membrane filtration systems," Journal of Membrane Science, vol. 446, pp. 189-200, 2013.
C. Fritzmann, M. Wiese, T. Melin, and M. Wessling, "Helically microstructured spacers improve mass transfer and fractionation selectivity in ultrafiltration," Journal of Membrane Science, vol. 463, pp. 41-48, 2014.
J. Liu, A. Iranshahi, Y. Lou, and G. Lipscomb, "Static mixing spacers for spiral wound modules," Journal of Membrane Science, vol. 442, pp. 140-148, 2013.
A. Shrivastava, S. Kumar, and E. L. Cussler, "Predicting the effect of membrane spacers on mass transfer," Journal of Membrane Science, vol. 323, pp. 247-256, 2008.
K. J. Farrell, I. Heat Transfer Research, U. S. B. o. R. W. T. E. R. Team, W. D. Research, and D. Program, Reduced Membrane Fouling Potential by Tailored Fluid/structure Interaction: U.S. Department of the Interior, Bureau of Reclamation, Technical Service Center, Water and Environmental Services Division, 2008.
A. L. Ahmad, K. K. Lau, and M. Z. Abu Bakar, "Impact of different spacer filament geometries on concentration polarization control in narrow membrane channel," Journal of Membrane Science, vol. 262, pp. 138-152, 2005.
V. V. Ranade and A. Kumar, "Fluid dynamics of spacer filled rectangular and curvilinear channels," Journal of membrane science, vol. 271, pp. 1-15, 2006.
A. Siddiqui, N. Farhat, S. S. Bucs, R. V. Linares, C. Picioreanu, J. C. Kruithof, et al., "Development and characterization of 3D-printed feed spacers for spiral wound membrane systems," Water research, vol. 91, pp. 55-67, 2016.
W. Li, K. K. Chen, Y.-N. Wang, W. B. Krantz, A. G. Fane, and C. Y. Tang, "A conceptual design of spacers with hairy structures for membrane processes," Journal of Membrane Science, vol. 510, pp. 314-325, Jul. 15, 2016.
K. Kim, W. Zhu, X. Qu, C. Aaronson, W. R. McCall, S. Chen, et al., "3D Optical Printing of Piezoelectric Nanoparticle—Polymer Composite Materials," ACS Nano, vol. 8, pp. 9799-9806, Oct. 28, 2014 2014.
A. R. Schultz, P. M. Lambert, N. A. Chartrain, D. M. Ruohoniemi, Z. Zhang, C. Jangu, et al., "3D Printing Phosphonium Ionic Liquid Networks with Mask Projection Microstereolithography," ACS Macro Letters, vol. 3, pp. 1205-1209, Nov. 18, 2014 2014.
Foreign Correspondence From a Related Counterpart Application, International Search Report and Written Opinion dated Feb. 6, 2017, International Application No. PCT/SG2016/050592 filed on Dec. 6, 2016.

(56) References Cited

OTHER PUBLICATIONS

Li, W. et al., "A Conceptual Design of Spacers with Hairy Structures for Membrane Processes", J. Membrane Sciences, Mar. 15, 2016, vol. 510, pp. 314-325.

Fig. 5(d)
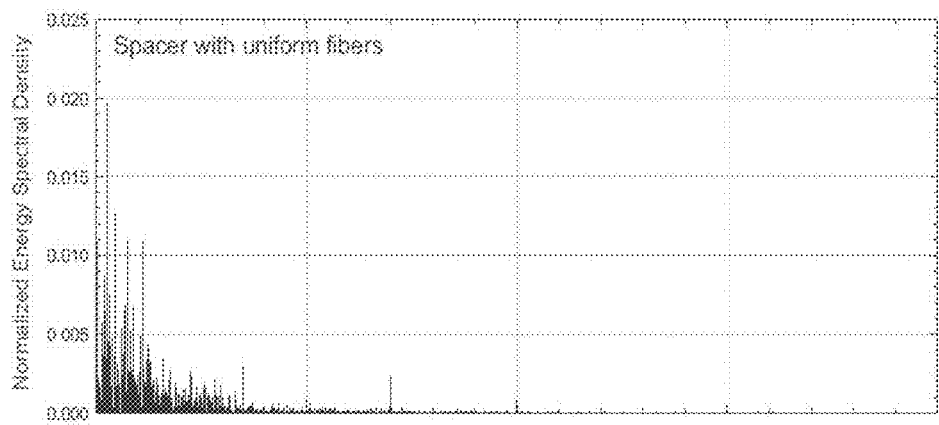
Fig. 5(e)
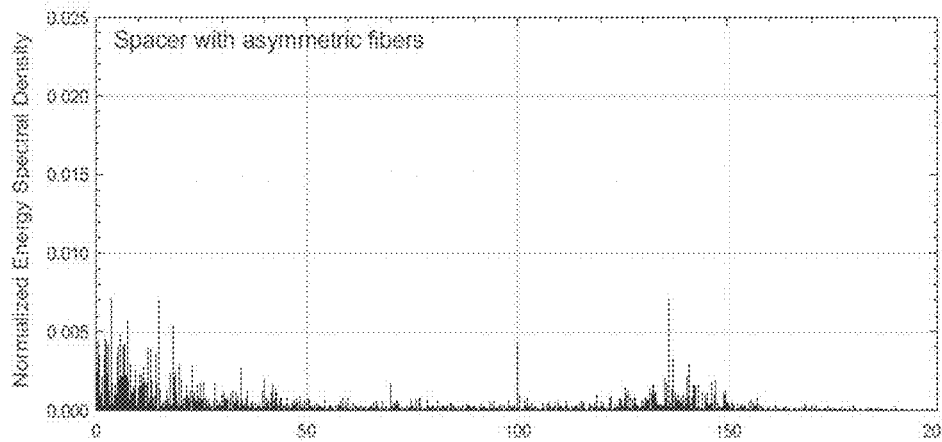
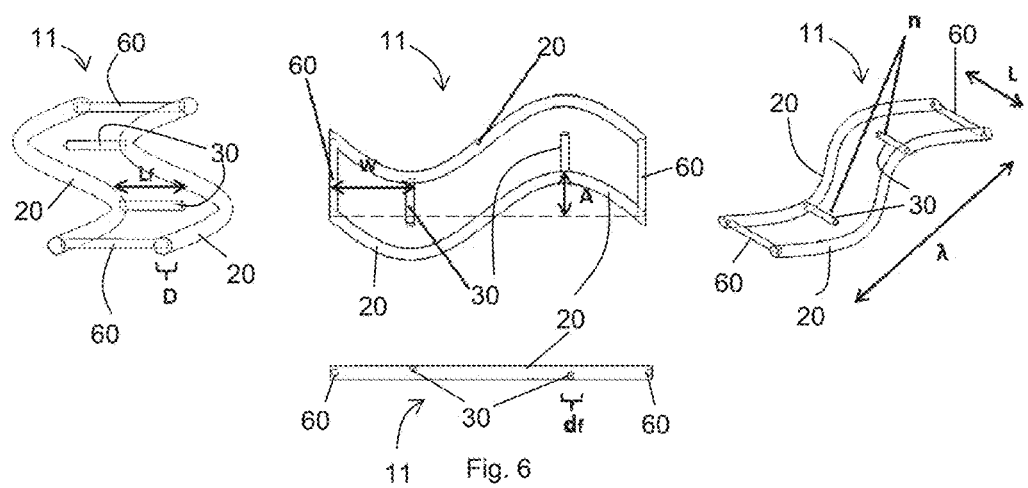
Fig. 6

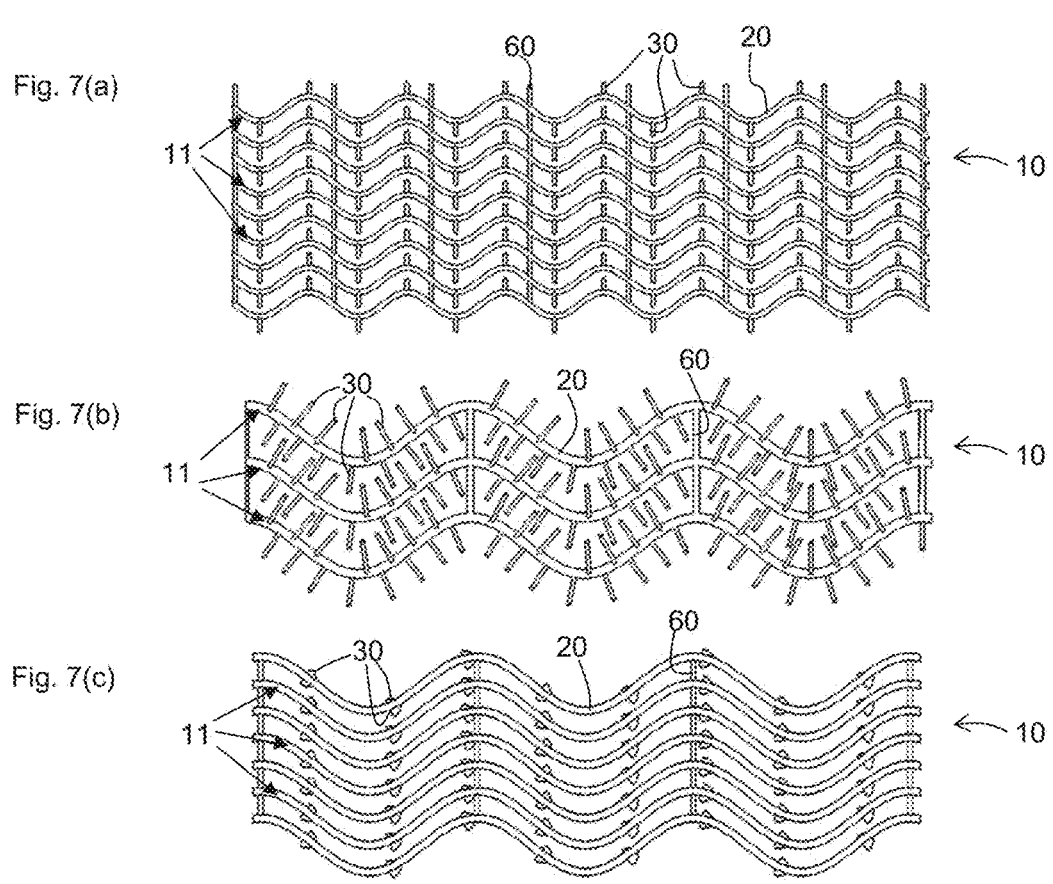

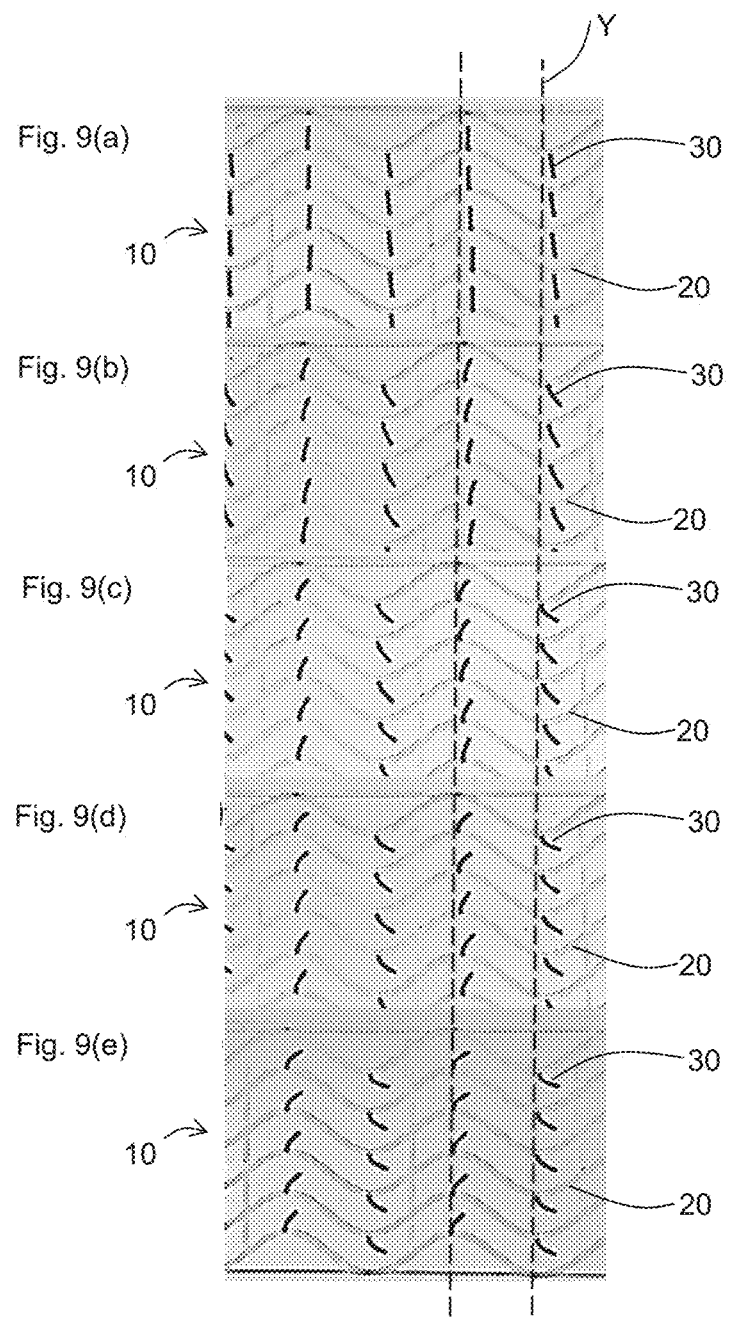

SPACER FOR A MEMBRANE MODULE

CROSS-REFERENCE TO RELATED APPLICATIONS

The present application is a filing under 35 U.S.C. 371 as the National Stage of International Application No. PCT/SG2016/050592, filed Dec. 6, 2016, entitled "SPACER FOR A MEMBRANE MODULE," which claims priority to Singapore Application No. SG 10201510438Y filed with the Intellectual Property Office of Singapore on Dec. 18, 2015, and to Singapore Application No. SG 10201605558R filed with the Intellectual Property Office of Singapore on Jul. 7, 2016, each of which are incorporated herein by reference in their entirety for all purposes.

FIELD

This invention relates to a spacer for a membrane module.

BACKGROUND

Heat or mass transfers between fluid and exchange surfaces are hindered by the presence of boundary layers. Boundary layers refer to regions where fluid flow near walls of the exchange surface is relatively stationery compared to the bulk of the fluid away from the walls. Flow promoters are structures that can be inserted at the walls of the exchange surface to disrupt the boundary layers, thereby facilitating heat or mass transfer.

In membrane separation processes such as microfiltration (MF), ultrafiltration (UF), nanofiltration (NF), reverse osmosis (RO), forward osmosis (FO), electrodialysis, membrane distillation etc., operational issues such as temperature polarisation, concentration polarisation and fouling are consequences of poor hydrodynamic conditions due to boundary layers. For example, concentration polarisation happens when solutes rejected by a membrane accumulate near the membrane surface causing high solute concentration near the membrane surface, greater than the bulk concentration. High degree of concentration polarisation can exacerbate fouling. Therefore, it is important for membrane modules to have good fluid management in order to reduce the effect of concentration polarization and fouling.

Conventional plastic net-typed spacers, typically produced via common extrusion methods and ranging between 0.6-0.9 mm in thickness are used to improve the heat or mass transfer, by static mixing or creating eddies. A conventional mesh spacer generally has two layers of filaments. The filaments in the same layer are parallel to each other, and they cross the filaments in the adjacent layer at an angle. The conventional method of making spacers or flow promoters for membrane modules involved the extrusion of polypropylene (PP) materials into two layers of filaments. The first layer of filaments was placed parallel to each other at regular intervals specifically known as the mesh length. The second layer of filaments was welded at an angle known as the hydrodynamic angle on top of the first layer. Other methods described in previous patent and literature include vacuum foaming, embossing, fusion bonding, pressing with a die, milling and 3D printing techniques such as SLS, FDM, SLA and Polyjet.

The geometrical characteristics of conventional spacers on mass transfer and pressure drop have been extensively studied [3-7]. However, conventional spacers are associated with several issues such as pressure loss, fouling, and maldistribution of flow. For example, the presence of a spacer in the flow channel hinders fluid flow, causing a drop in pressure across the membrane module, while fouling problems are found to be associated with the accumulation of foulants on the spacer as the spacer may provide localized dead spots with poor mass transfer that initiate fouling. As more knowledge about conventional spacers was obtained, researchers began to design novel spacers with modified structures for further enhancing filtration performance.

Prior work on spacer modifications was aimed at altering and optimizing the geometry of the conventional spacer filaments. A variety of shapes has been proposed for modifying the cross-section of the filaments [8, 9], which usually has a cylindrical cross-section. The work on altering the filament diameter, angles, and other geometrical properties can be also found in the published papers and patents [10, 11]. A special spacer design was reported that replaced the cylindrical filaments with twisted tapes [12, 13]. Several novel designs were proposed to optimize the shape of the spacer filaments [8, 9], the topological structures of the network [10, 11], and the curvature of the fluid channels formed by the spacer filaments [12, 13, 19].

In addition to the modifications of the filaments, some studies focused on optimizing the structures of the network by replacing the single layer network with a multi-layer structure that has different geometric characteristics for each layer [14-16]. For example, Schwinge et al. [14] added an additional layer of filaments into the conventional spacer mesh that consists of filaments crossing each other in two directions. The idea of this design is to reduce the void space in the fluid channel without increasing the membrane area covered by the spacer. The spacers proposed by the University of Twente [15, 16] adopted a network that sandwiches a spacer with normal or modified filaments between two thinner spacers, which contact the membrane surface in a more intimate manner. Although these spacer designs are able to markedly enhance the mass transfer, they inevitably suffer from the increase in the pressure drop through the membrane module, thereby resulting in an increase in the energy consumption.

Some designs were proposed in an attempt to balance these opposing effects. For example, zigzag and sinusoidal spacers were investigated by computational fluid dynamics [17-19]. Xie et al. [19] recently employed sinusoidally shaped spacer filaments for enhancing the performance in reverse osmosis (RO) processes. The smooth tortuous channels could enhance the extent of turbulence and were expected to reduce the hydrodynamic resistance while avoiding a significant increase of the hydraulic resistance. However, the study indicated a sharp increase in the pressure drop when the amplitude and spatial frequency of the sinusoidal channel were increased to certain critical values and its wavelength was shortened to some critical values. Moreover, these tortuous structures increased the propensity of fouling.

Research on optimisation of spacers mainly involved experiments on modification of commercial feed spacers. While there are limited works on innovative spacer geometries [14-16, 19, 28-38], some were solely simulated via CFD to study the effect of geometrical designs on spacer performance in order to achieve an optimal spacer design with good performance [8, 39-41]. However, difficulties in manufacturing complex spacer designs made it not possible to validate the CFD simulations. To date, there has been limited experimental work reported to confirm the direct impact of spacer geometry on fouling.

It should be noted that the boundary layer mass coefficients (k) provided by current spacers limit the potential of next generation high permeability membranes. This is because concentration polarization is related to the ratio (flux/k), so higher flux requires higher k; novel spacers may be able to provide higher k without high pressure losses. The second issue of membrane fouling is a process whereby a thin film of foulant is deposited on a membrane surface so that the overall performance of membrane is decreased. Membrane fouling can cause severe flux decline and hence require higher transmembrane pressure to maintain the same flux. Severe membrane fouling may require intense chemical cleaning or membrane replacement, which further increases the operating costs of a desalination plant.

A spiral wound module (SWM) is the workhorse for RO processes. It has complex hydrodynamics due to the presence of the feed spacers. Membrane fouling of a SWM is further complicated by the permeation of water through the membrane while the solute is rejected by the active layer of the membrane and hence concentration polarization on the membrane surface and pressure loss along the channel. The filtration performance of a SWM can be significantly affected by the spacers. They not only define the space between the membrane leaves, but also play a role as a turbulence promoter (some studies refer to them as an eddy promoter since the flow may not be fully developed [1, 2]). Schwinge et al. indicate that the spacer in a fluid channel can intensify the mass transfer, thereby mitigating the negative effects caused by the concentration polarization (CP) and membrane fouling [2].

It is therefore of primary importance to optimize spacers for better filtration performance. This is a key to the exploitation of next generation high flux RO membranes because it is necessary to maintain the ratio of flux to boundary layer transfer coefficient to avoid excessive CP and fouling.

SUMMARY

Disclosed is a spacer with dynamic structures that can interact with the flowing fluid. On one hand, the interaction between the dynamic structures and fluid can promote turbulence for better mass transfer; on the other hand, the response of the dynamic structures to the fluid, i.e., the induced structural deformation, can be beneficial for reducing the pressure drop relative to that offered by conventional spacers.

According to a first aspect, there is provided a spacer for a membrane module, the spacer comprising: a plurality of first filaments defining a plurality of fluid flow channels, in use the plurality of fluid flow channels being adjacent a membrane of the membrane module; and a plurality of second filaments provided on the plurality of first filaments and extending into the fluid flow channels, the second filaments moveable relative to the first filaments in response to an external stimulus during flow of fluid in the fluid flow channels.

The first filaments may be made of a material of greater shore hardness than the second filaments.

The first filaments may be made of a material of greater tensile strength than the second filaments.

The second filaments may be made of a material of greater percentage of elongation at break than the first filaments.

At least a portion of the plurality of second filaments may comprise a magnetic material and the external stimulus may comprise a magnetic field.

At least a portion of the plurality of second filaments may comprise a piezoelectric material and the external stimulus may comprise an electric field.

At least a portion of the plurality of second filaments may comprise a photolabile conductive polymer and the external stimulus comprises an electric field.

At least a portion of the plurality of second filaments may comprise rod-like structures.

At least a portion of the plurality of second filaments may comprise vortex generating structures.

At least a portion of the plurality of second filaments may have a cross-sectional shape selected from the group consisting of: circular, elliptical, rectangular and helical.

At least a portion of the plurality of second filaments may comprise asymmetrical filaments.

The asymmetrical filaments may each comprise a length of filament having a bulbous free end.

The bulbous free end may comprise a magnetic bead.

At least a portion of the plurality of fluid flow channels may have a pattern selected from the group consisting of: sinusoidal and zigzag.

The plurality of second filaments may be integral with the plurality of first filaments.

The plurality of first filaments and the plurality of second filaments may be provided in an array of unit cells, each unit cell comprising a number of the first filaments having a number of the second filaments provided thereon.

The spacer may further comprise bridging filaments connecting adjacent unit cells.

The spacer may be 3D printed.

According to a second aspect, there is provided a membrane module comprising the spacer of the first aspect, the spacer provided adjacent a membrane of the membrane module.

The membrane module may be selected from the group consisting of: spiral wound membrane module, plate and frame module and submerged flat sheet module.

In this application, the terms 'framework,' 'primary structure' and 'first filament' are used interchangeably to refer to a first structural entity of the spacer, the first structural entity being labelled with reference numeral 20 in the figures. The terms 'dynamic structure,' 'dynamic element,' 'hairy fiber,' 'fiber,' 'hairy structure,' 'flexible structure,' 'flexible filament,' 'mobile element,' 'secondary structure,' 'second filament,' and the like are used interchangeably to refer to a second structural entity of the spacer, the second structurally entity being labelled with reference numeral 30 in the figures.

BRIEF DESCRIPTION OF FIGURES

In order that the invention may be fully understood and readily put into practical effect there shall now be described by way of non-limitative example only exemplary embodiments of the present invention, the description being with reference to the accompanying illustrative drawings.

FIG. 5(d) is a graph of comparison of the fiber vibrations in the frequency domain for uniform fibers.

FIG. 5(e) is a graph of comparison of the fiber vibrations in the frequency domain for asymmetric fibers.

FIG. 6 is an image of the structure of one unit cell of an exemplary spacer.

FIG. 7(a) is an image of a possible design of the multi-material responsive spacer.

FIG. 7(b) is an image of a possible design of the multi-material responsive spacer.

FIG. 7(c) is an image of a possible design of the multi-material responsive spacer.

FIG. 9(a) is an image of the validation test of the dynamic movements of the multi-material spacer at increasing flow rate 0 L/min.

FIG. 9(b) is an image of the validation test of the dynamic movements of the multi-material spacer at increasing flow rate 0.4 L/min.

FIG. 9(c) is an image of the validation test of the dynamic movements of the multi-material spacer at increasing flow rate 0.6 L/min.

FIG. 9(d) is an image of the validation test of the dynamic movements of the multi-material spacer at increasing flow rate 0.8 L/min.

FIG. 9(e) is an image of the validation test of the dynamic movements of the multi-material spacer at increasing flow rate 1.0 L/min.

DETAILED DESCRIPTION

Figure 1:
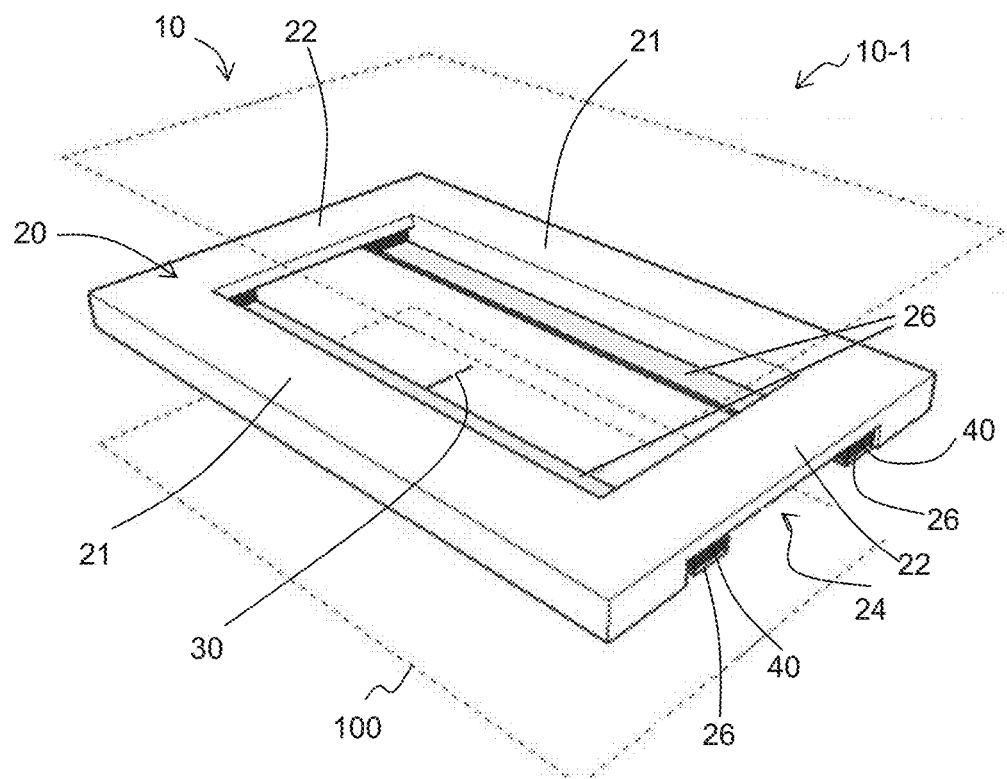
FIG. 1 is a schematic illustration of the framework for fixing hairy fibers (i.e., dynamic structures). Different types, numbers and arrangements of fibers can be applied to this framework which then is used as a prototype of the spacer with hairy structures.

Exemplary embodiments of a spacer 10 for a membrane module will be described below with reference to FIGS. 1 to 11 in which the same reference numerals are used to denote the same or similar parts.

The proposed spacer 10 comprises a rigid framework 20 and dynamic (mobile) elements or structures (hairy fibers) 30 that are flexible and can significantly interact with the surrounding fluid field. The surrounding fluid field is typically a fluid flow space adjacent a membrane 100 in the membrane module. The fluid-structure interactions induced by the dynamic elements 30 are beneficial to the mass transfer of solutes (or foulants) in the cross flow, thereby alleviating the negative effects of the concentration polarization and fouling. Deformation of the flexible structures 30 will minimize the pressure loss caused by the hydraulic drag effect between the fibers 30 and the fluid compared to conventional spacers without the flexible structures 30. Moreover, the hairy structures 30 can be applied to the region in close proximity to the membrane surface 100 so that the vibrations of the fibers 30 can directly disrupt the boundary layers (concentration and velocity). In contrast, reducing the distance between the membrane 100 and a prior art spacer with rigid structures usually causes undesirable 'hydrodynamic dead regions' at the membrane surface 100.

Asymmetry of the hairy structures 30 is a key component for a passive response design. In a case study, applying a small bead 39 to the tips of the fibers 30 as shown in FIGS. 2(a)-(d) and FIG. 3(b) can essentially enhance the interplay between the fibers 30 and fluid and yield a more significant increase of the filtration performance even in a simple prototype framework 20. Moreover, the asymmetric structure 30 can be modified by changing the geometry or appending different geometrical structures, which may give rise to more beneficial effects.

The dynamic elements 30 are a functional part of the membrane spacer 10, which can be readily incorporated into various spacer networks for synergistic effects. This is in contrast to prior art spacer designs that are usually exclusive to others. The dynamic structures 30 not only function independently, but also have the advantage to work with other spacer designs, which actually serve as the framework 20 for the fibers 30.

The key part of a dynamic spacer 10 is the mobile elements 30 that can actively or passively respond to the fluid. For the active cases, the movement of the mobile elements 30 can be induced by applying an external field (e.g., electric or magnetic field) that is periodically or randomly oscillating, when the mobile elements 30 are fabricated so that they can respond to the external field. The passive cases can be referred to as a more fundamental form of the dynamic spacers 10, since the passive response of the mobile elements 20 is simply dependent on the dynamic interplay between the spacer 10 and the flowing fluid. An example of the passive design is the use of hairy structures 30 in a suitable framework 20. The framework 20 can be a conventional spacer or a spacer with some novel structures. The hair-like structures 30 are flexible in contrast to the rigid framework 20 such that they 30 can dynamically respond to the periodic or random disturbances caused by the surrounding fluid. A well-designed hairy structure 30 can amplify the fluid-induced disturbances so that a positive feedback is generated to promote turbulence in the fluid.

The spacer 10 aims to address the problems of low mass transfer and membrane fouling in membrane modules, in particular the spiral wound module (SWM), through the optimization of the membrane spacer 10. In particular, the two problems of low mass transfer and membrane fouling are addressed through the spacer 10 which includes four important properties: (1) structure; (2) dimension; (3) materials; (4) surface chemistry.

The spacer 10 is a multi-material responsive flow promoter that may be fabricated via 3D printing/rapid prototyping, in general, to improve hydrodynamic or thermal conditions between the fluid and the exchange surface. The spacer 10 has more than one type of material (i.e. flexible and rigid materials) that can respond to external stimulus (e.g. hydrodynamic forces, magnetic, electric etc.). The benefits of the spacer 10 include reduced fouling and energy demand through reduction of concentration polarization on the membrane surface 100.

The disclosed functional spacer 10 includes two characteristics (a) multi-material and (b) responsive to external stimulus.

(a) Multi-Material

The multi material spacer 10 comprises a range of hard-soft materials such that specific sections of the spacer 10 can have flexible or rigid properties. The flexible properties on the selected section 30 of the spacer 10 that comprises the dynamic elements 30 allows dynamic movement under varying flow rate, which may in turn create a "sweeping" effect that disrupt the boundary layers and prevent foulants from accumulating near spacer filaments and on the membrane surface, thereby mitigating fouling. Problems of conventional static spacers such as localized dead spots with poor mass transfer that initiate fouling may be solved with the "sweeping effect" of the flexible sections 30 of the spacer 10. Also, the multi material spacer 10 can be fabricated in one single step automation without further need of assembly, and with high reproducibility and controllable geometries. Innovative yet complicated geometries that are not feasible to be manufactured via existing methods can be achieved with the present method of forming the spacer 10.

(b) Responsive to External Stimulus

1) Hydrodynamic Forces

Flexible filaments 30 of the spacer 10 will move due to the hydrodynamic forces of the fluid that flow through the spaces. Under pulsating flow, the varying shear stresses acting on the flexible filaments 30 cause the filaments 30 to act in a way similar to a 'car wiper.'

2) Magnetic Forces

Magnetic nanoparticles including ferrite nanoparticles or iron oxide nanoparticles etc. can be incorporated into the resin material, allowing the encapsulating of magnetic particles in the feed spacer filaments 30 via UV photopolymerisation during a printing process of forming the spacer 10. Under the effect of magnetic field, specific sections 30 of the feed spacer 10 printed with photoliable magnetic composite material will be able to react to the magnetic field and respond.

3) Electric Forces

Piezoelectric materials including zinc oxide, aluminum nitride, polyvinylidene fluoride, lithium tantalite, polyvinylidene fluoride, lanthanum gallium silicate, potassium sodium tartrate, barium titanate etc. can be incorporated into a photoliable polymer solution [44]. Photopolymerisation during the printing process enables the piezoelectric materials to be encapsulated in the feed spacer 10. Under shear stresses caused by fluid flow in the channel, the piezoelectric polymer will be able to convert compressive or tensile stresses to electric charges and vice versa. An applied electric field will change the shape of the piezoelectric composite feed spacer 10, creating a feed spacer responsive to electric field.

In addition to piezoelectric materials, photolabile conductive polymer including ionic liquids can also be used as the 3D printing material to fabricate spacers 10 with conductive filaments 30 that can respond to an electric field [45].

Experimental Design and Analysis of Prototype

In an exemplary embodiment as shown in FIG. 1, the spacer 10 with hairy structures 30 was demonstrated as a prototype 10-1 with a simplified framework 20. This framework 20 can be easily modified to accommodate more complicated geometries for synergistic effects. FIG. 1 shows the framework 20 fixed with a flexible fiber 30 (an example of the hairy structures). The framework 20 was generally rectangular and composed of two lengthwise pieces 21 with a width of 9.5 mm and two transverse pieces 22 with a width of 9 mm. The framework 20 defines a fluid flow channel 24 adjacent a membrane 100.

The thickness of the lengthwise pieces 21 approximately matched the depth of the fluid channel 24 (3.5 mm), whereas the transverse pieces 22 had an indent of about 2.5 mm on the side facing the membrane 100 so that the fluid could enter the channel 24 with less resistance. The effective cross-sectional area of the fluid channel 24 was approximately $91 \times 10^{-6}$ m$^2$ (26 mm×3.5 mm). The fibers 30 were glued onto a disposable plastic strip 26 (91 mm×4 mm×0.5 mm). This strip 26 then was fixed into the framework 20 alongside one of the lengthwise pieces 21 by applying modeling clay 40 to the indents and attaching the ends of the strip 26 to the two transverse pieces 22 via the modeling clay 40 so that the distance between the fibers 30 and the membrane surface 100 could be varied. In all the experiments the fibers 30 were in close proximity to the membrane surface 100 (from about 0.5 to 1.5 mm).

Figures 2A, 2B, 2C, 2D:
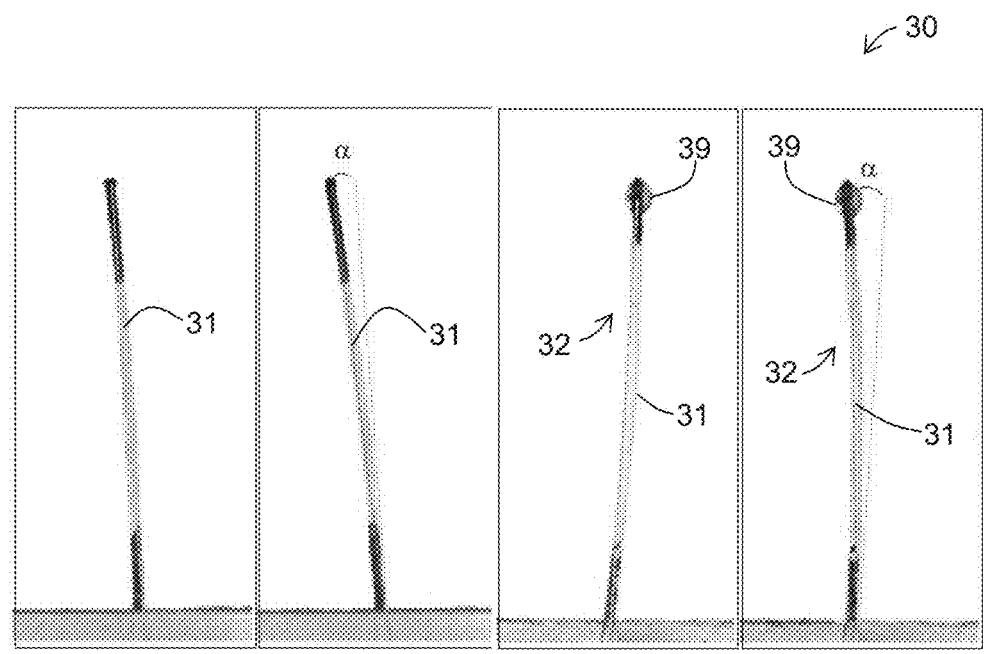
FIG. 2(a) shows the image of actual fibers used in the current design wherein there is a uniform fiber at rest.
FIG. 2(b) shows the image of actual fibers used in the current design wherein there is a uniform fiber having an angular displacement α.
FIG. 2(c) shows the image of actual fibers used in the current design wherein there is an asymmetric fiber at rest.
FIG. 2(d) shows the image of actual fibers used in the current design wherein there is an asymmetric fiber having an angular displacement α.
Figure 3A:
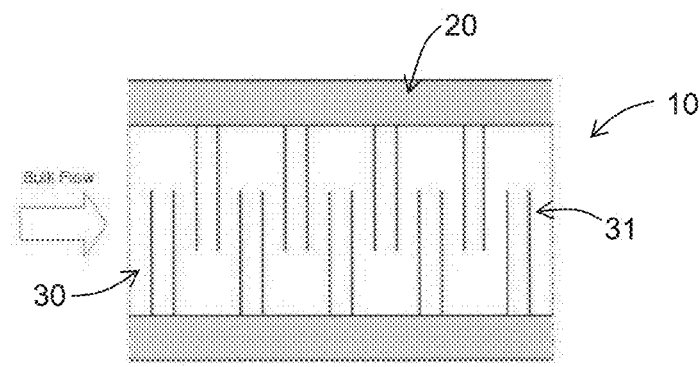
FIG. 3(a) is a schematic illustration of an array with flexible uniform fibers used for FO filtration tests.
Figure 3B:
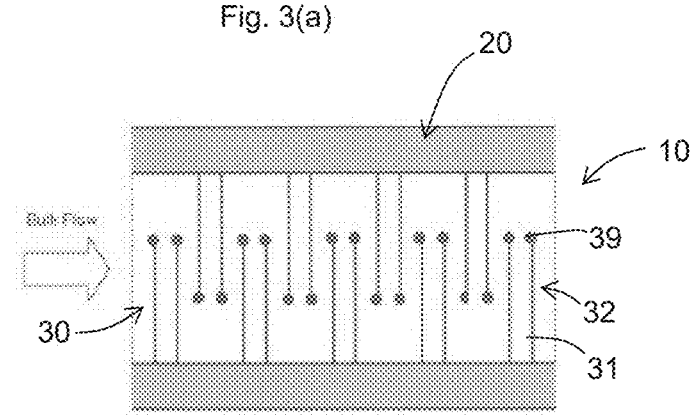
FIG. 3(b) is a schematic illustration of an array with flexible asymmetric fibers used for FO filtration tests.
Figure 3C:
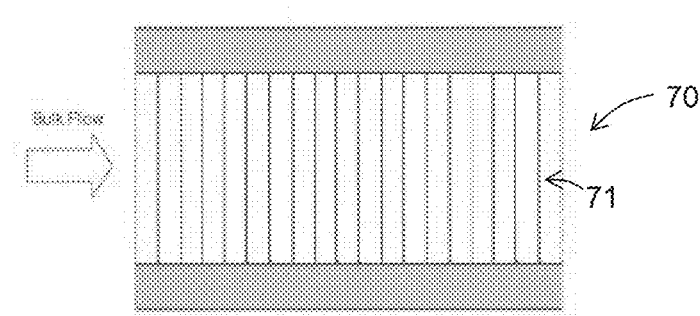
FIG. 3(c) is a schematic illustration of an array with rigid fibers (taut strings) used for FO filtration tests.

Two basic forms of hairy structures 30 were investigated in the prototype 10-1. The first type of fiber 30 had a uniform structure 31. The uniform fibers 31 were fabricated using a segment of nylon thread with a nominal diameter $d_f$ of 0.2 mm. In the current design, the thread segments had a length $L_f \approx 11$ mm ($L_f/d_f \approx 55$). A uniform fiber 31 at rest and with an angular displacement α is shown in FIG. 2(a) and FIG. 2(b), respectively. The second type 32 of fiber 30 had an asymmetric structure, which was expected to have a stronger response to the flowing fluid. The asymmetric fibers 32 were fabricated by attaching an epoxy bead 39 at the tip of a uniform fiber 31, thereby forming an asymmetrical filament having a bulbous free end 32. FIG. 2(c) and FIG. 2(d) demonstrate an asymmetric fiber 32 at rest and with an angular displacement α, respectively. These fibers 32 were glued onto the framework 20 to form a fiber array as shown in FIG. 3(a) and FIG. 3(b) for the uniform fibers 31 and asymmetric fibers 32, respectively. In order to verify the effects of the flexible structures 30 in comparison with that of a rigid structure, a rigid spacer 70 prototype was prepared with taut strings 71 to approximate a rigid structure 70 as shown in FIG. 3(c).

Figure 4A:
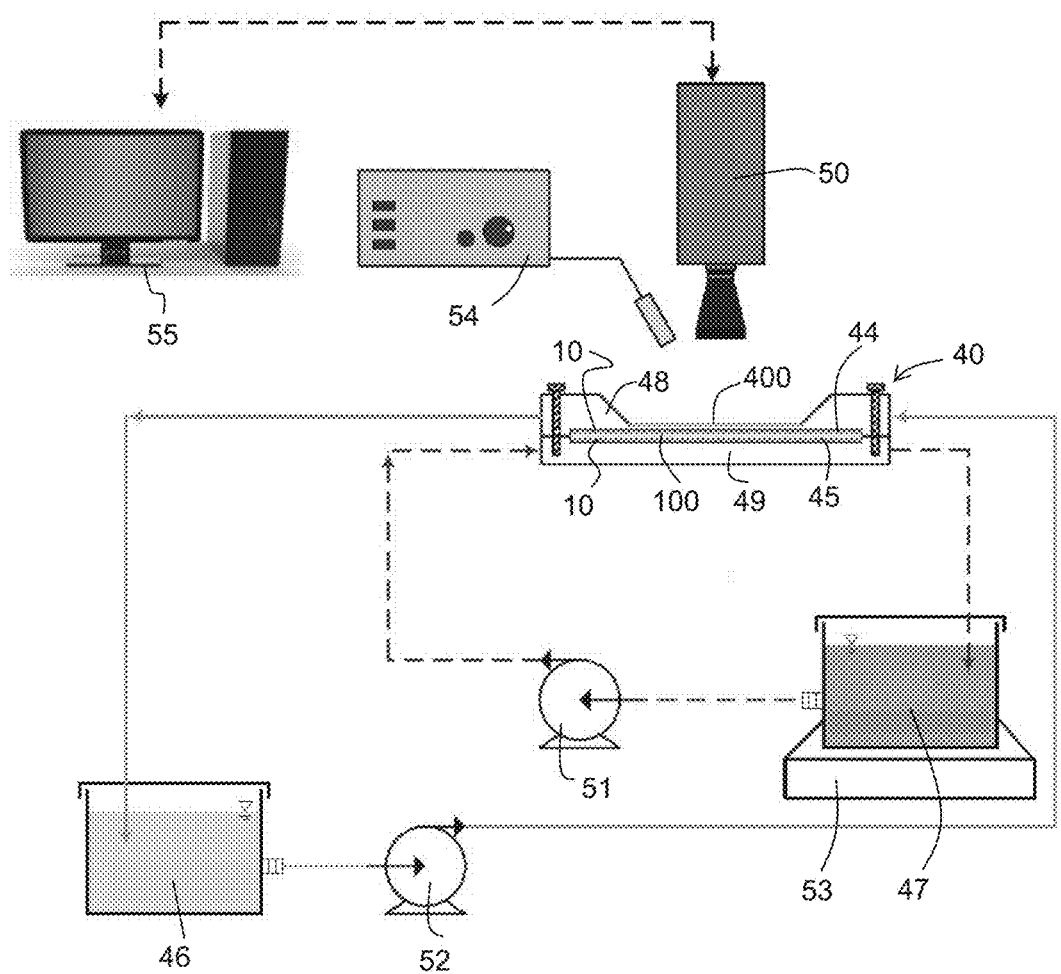
FIG. 4(a) is a schematic illustration of a filtration performance characterization system.

The performance of the hairy spacers 10 was investigated using a series of forward osmosis (FO) tests on the prototype 10-1. The FO filtration was performed using a filtration system as shown in FIG. 4(a). The same spacer prototypes 10 were placed in a filtration cell 40 in fluid channels 44, 45 above and beneath the FO membrane 100 (TFCFO, water permeability 2.6 LMH/bar, NaCl rejection 94.8%, HTI, Albany, Oreg.). A feed solution of pure water 46 was circulated through the top channel 44 using a feed pump 52 (as indicated by the solid lines) while a draw solution comprising a salt solution 47 of 1 M NaCl was flowed through the bottom channel 45 in the opposite direction using a draw pump 51 (as indicated by the dotted lines). The crossflow rates in both channels 44, 45 were maintained at approximately $3.2 \times 10^{-5}$ m$^3$/s. The draw solution 47 was placed on a digital balance 53.

Figure 4B:
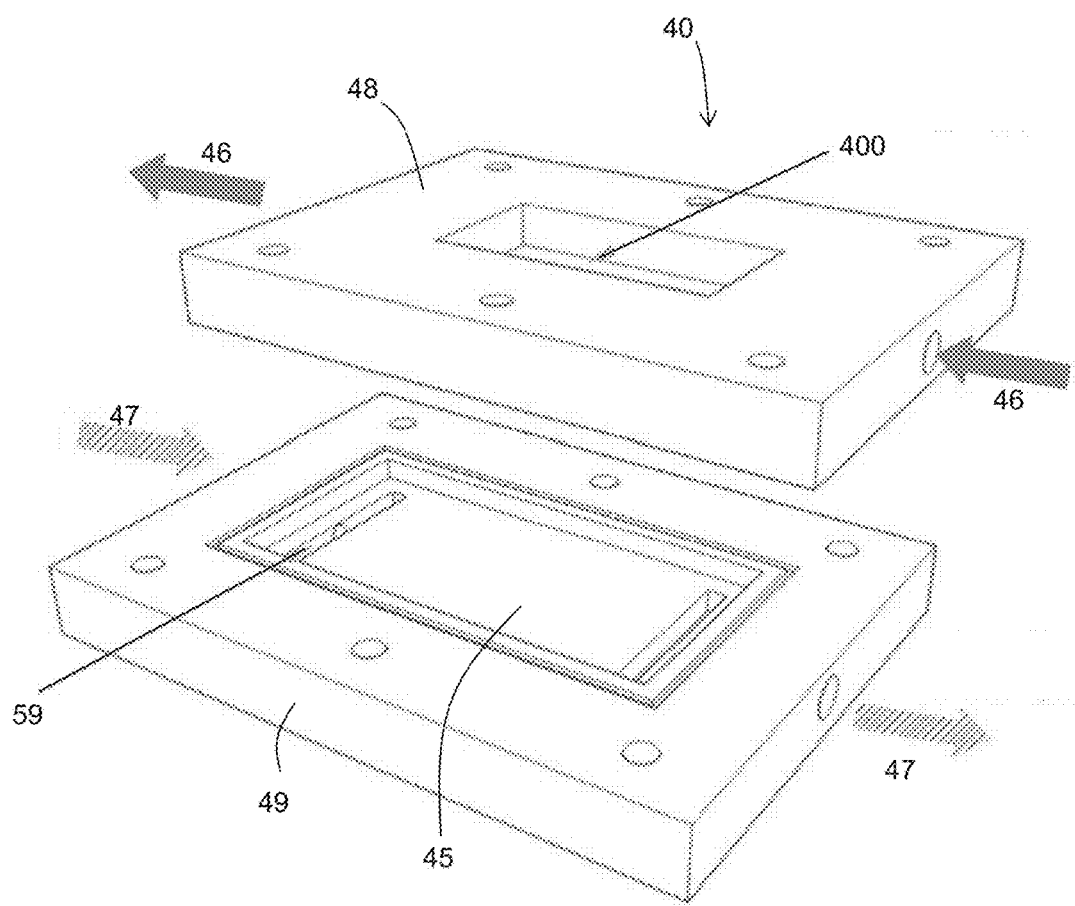
FIG. 4(b) is a perspective illustration of an observation (filtration) cell. The fiber vibrations were observed through the glass window of the cell using a high speed camera.

The geometry of the filtration cell 40 is shown in FIG. 4(b). The filtration cell 40 was composed of a top plate 48 and a bottom plate 49 each having a fluid channel 44, 45 respectively. The fluid channels 44, 45 were configured to be of the same size on either side of the membrane 100 (92 mm×45 mm×3.5 mm). In particular, the central part of the top plate 48 was modified by replacing the top plate 48 with a transparent glass window 400 (64 mm×32 mm×2 mm), so that the fiber 30 vibrations could be observed using a high speed camera (Olympus, i-Speed LT) 50 when illuminated by a light source 54 and the output of the camera 50 captured by a data acquisition computer 55.

The FO water flux was measured for the spacer prototypes 10 that are schematically shown in FIGS. 3(a) and 3(b). During the FO filtration evaluation, both channels 44, 45 of the filtration cell 40 were filled with the same spacer prototypes 10 or 70, and the feed 46 and draw 47 solutions were circulated through the top 44 and bottom 45 channels, respectively, via liquid distribution inlets 59. The spacer prototypes 10 contained approximately forty fibers 30 fixed onto the framework 20 in the pattern shown in FIGS. 3(a) and 3(b). The crossflow rate was $3.2 \times 10-5$ m3/s. The permeate flux was measured by weighing the tank containing the salt solution 47 using the digital balance 53. Specially, the active layer of the FO membrane was exposed to the draw solution to reduce the effect of the internal concentration polarization (ICP). The flow rate in each channel was set at the same level for all the filtration tests.

Figure 5A:
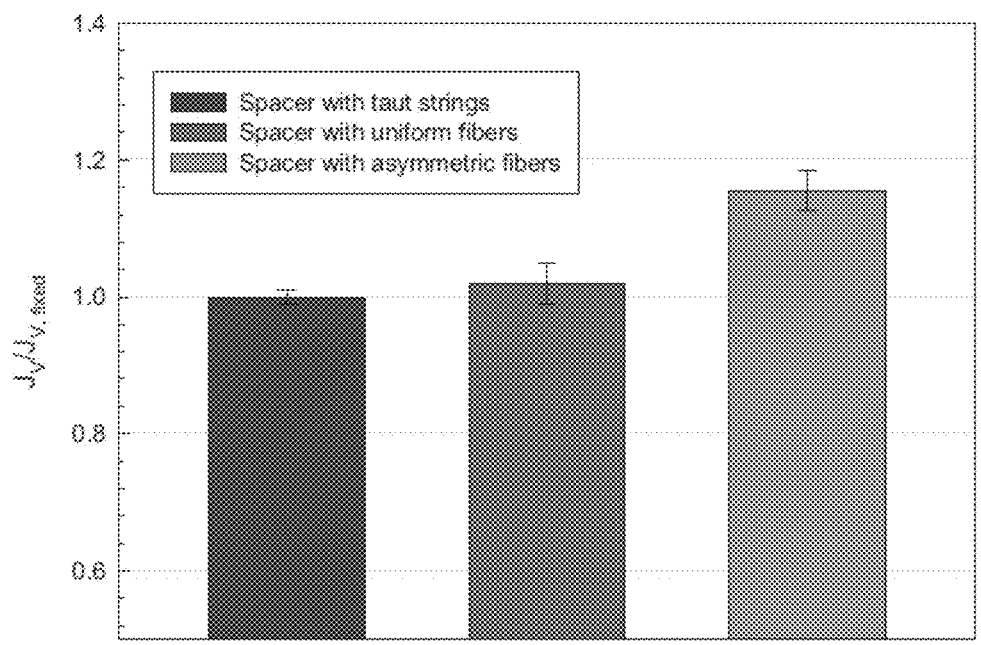
FIG. 5(a) is a graph of comparison of the permeate fluxes of the FO filtration with various spacer prototypes.
Figure 5B:
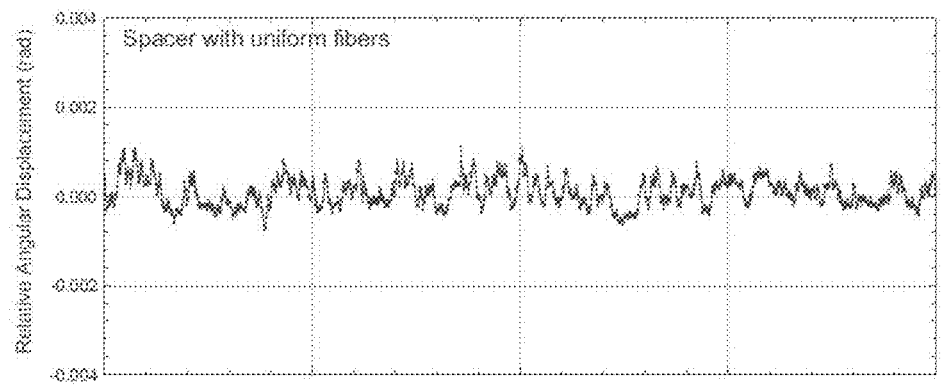
FIG. 5(b) is a graph of comparison of the fiber vibrations in the time domain for uniform fibers.
Figure 5C:
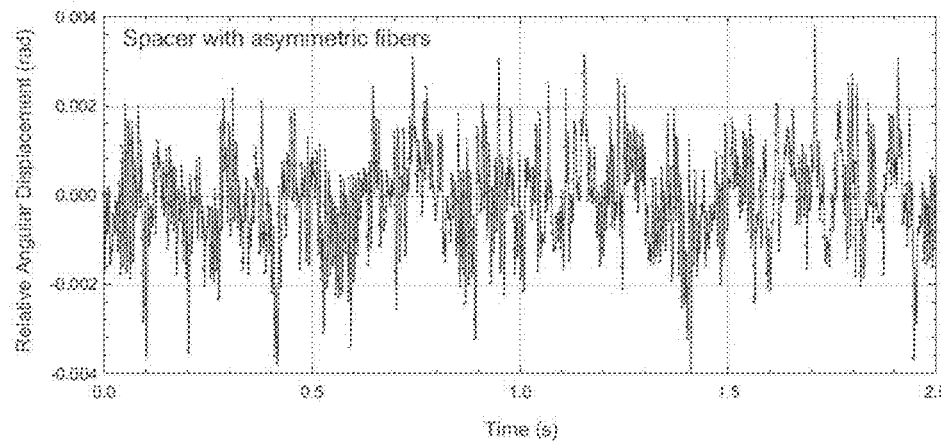
FIG. 5(c) is a graph of comparison of the fiber vibrations in the time domain for asymmetric fibers.

The measured water fluxes are compared in FIG. 5(a). The spacer 70 with taut strings 71 was used as the baseline for normalizing the water flux. It clearly shows that the permeate flux was increased when replacing the rigid structure (taut string array) 70 with the flexible structures 30, including both the uniform 31 and asymmetric 32 fiber arrays. It is also noted that the asymmetric 32 fiber array had a much more significant effect on the water flux increase (an increase of approximately 16% compared to an increase of approximately 3% for the uniform fiber array).

The interactions between the fibers 30 and fluid were verified by characterizing the angular vibrations of the fibers 30. The vibrations were characterized using the relative angular displacement. The energy spectral density was normalized and plotted using a drop line at each frequency. The fiber 30 vibrations were observed through the glass window 400 of the cell 40 using a high speed camera 50. In particular, the vibrations of a fiber 30 that was approximately in the center of the fiber array were recorded using the high speed camera 50. During the vibration characterization, pure water 46 was circulated through the top channel 44 that was filled with the spacer prototype 10. No solution was pumped into the bottom channel 45. Instead, the bottom channel 45 was filled with a glass plate (not shown) with the same size as the channel such that the effective channel height for the hair structures 30 could be close to that used in a membrane module. The angular displacement of the fiber 30 then was analyzed using in-house developed MATLAB codes.

The vibration analysis was implemented in both the time and frequency domains as shown in FIGS. 5(b)-5(e), respectively. The time-domain analysis clearly indicates that the asymmetric 32 structure significantly increased the angular vibration amplitude, implying a stronger interplay between the asymmetric fibers 32 and the fluid. The corresponding frequency-domain analysis (plotted as the normalized energy spectral density against vibration frequency) revealed that more high frequency components were present for the asymmetric 32 structure. The generation of high frequency vibrations indicates that the extent of turbulence of the crossflow had been significantly enhanced. The strong interactions between the flexible fibers 30 and the fluid were responsible for the enhancement of the mass transfer near the membrane surface 100 (i.e., the decrease of the external concentration polarization), which in turn resulted in a higher water flux.

Fabrication of Multi-Material Spacer

Compared to conventional fabrication methods, the novel and complex structure of the dynamic spacer 10 may be easily 3D printed via AM (additive manufacturing) technology, such as multi-layers spacers 10 with twisted tape filaments in the centre layer and staggered herringbone, and helical spacers. The advantages of AM technology are threefold: (1) their capability of supporting the fabrication of freeform design where complex and miniature structure is possible; (2) ease of validation of various 3D model designs for different membrane-based processes; (3) material saving up to 95% compared to traditional subtractive manufacturing since AM only uses the materials it needs to make the objects. Furthermore, multi-material objects can be manufactured via single-step automated fabrication. Clearly, the advent of additive manufacturing technology opens up an original and innovative way to conveniently fabricate a range of novel spacers 10 with complex geometry. When fabricated via 3D printing or other single-step manufacturing processes, the dynamic elements or second filaments 30 may thus be integral or monolithic with the primary structure or first filaments 20 of the spacer 10.

Materials and surface chemistry also play a critical role during membrane fouling. In general, foulant tends to attach on a relatively hydrophobic surface, such as a polymers. Materials with different tensile strength, elongation at break, or hydrophilicity/hydrophobicity that can be used for the spacer 10 include: polymers (more hydrophilic but soft), ceramics, metals (more hydrophilic but hard); while surface chemistry of spacers mainly include the surface roughness, surface charge, surface hydrophilicity/hydrophobicity. It is also possible to incorporate suitable nanomaterials or anti-fouling materials into the spacer 10 via post-treatment to provide an additional functionality of the 10 spacer in order to effectively prevent the formation of a fouling layer. The potential candidates for anti-fouling materials are silver nanoparticle, copper nanoparticle, and a halogenated furanone compound that has been reported to inhibit the formation of biofilm. In addition, other important parameters such as enhanced hydrodynamic flow while minimized shadow effects, reasonable mechanical and chemical stability will also be taken into the consideration during the design of the spacer 10.

Design Aspects

The multi-material responsive feed spacer 10 has four important technical aspects to its design. The design principles of the dynamic spacer 10 are based on four important parameters: structure, dimension, materials, and chemistry.

(a) Structure

The structure and dimension of the spacer 10 play an important role during membrane fouling due to the hydrodynamic dead zone between spacer 10 and membrane 100, which lead to accumulation of foulant in these zones. Compared to conventional net-type spacers which only consist of primary structure, the structure of the present spacer 10 comprises: (1) primary structure (macro-level) 20 and (2) secondary structure (micro-level) 30. One unit cell 11 of an exemplary embodiment of the spacer 10 is as shown in FIG. 6. Multiple unit cells 11 of the spacer 10 can be combined to form a feed spacer 10 of desired size. For the primary structure 20, in some embodiments, it may be designed in sinusoidal curves which can promote the mixing or vortices on the membrane surface 100 and hence decrease the concentration polarization. The primary structure 20 may alternatively be provided in any wavy, corrugating or zigzagging patterns. The spacer 10 may also comprise bridging filaments 60 that will connect the unit cells 11 together to form a whole spacer 10. The secondary structure 30 is on the primary structure 20. In some embodiments, the secondary structure 30 can be a rod-like structure or vortex generator-like structures on the sinusoidal curve 20 (see FIG. 7(c)). The micro structure 30 may have generally circular, elliptical, rectangular or helical cross sections etc. The positions of the secondary structure 30 can be along the center, upper or bottom part of the primary structure 20 cross-sections as show in the side view cross section in FIG. 6.

(b) Dimension

Figure 8A:
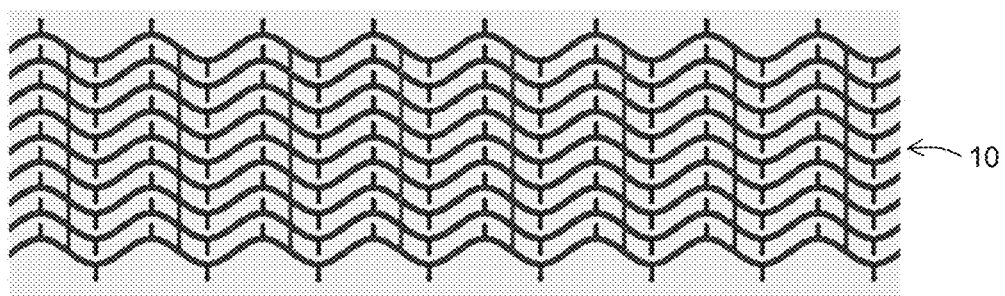
FIG. 8(a) is an image of a CAD design of multimaterial responsive spacer (top).
Figure 8B:
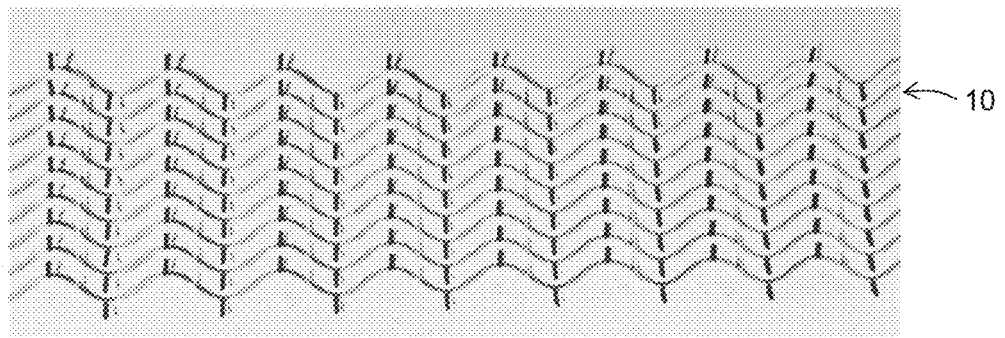
FIG. 8(b) is a picture of the 3D printed prototype of FIG. 8(a).

The primary structure 20 can be characterized by amplitude (A), diameter (D), wavelength (λ) and length (L) between the sinusoidal curves on the primary structure 20. The secondary structure 30 can be characterized by diameter (df), length (Lf) of the rod of the secondary structure 30 and the interval (w) or number (n) of secondary structures 30, and as shown in FIG. 6. One of the advantages of using CAD design is that these dimensions can be changed easily and the design can be rapidly prototyped via AM technology. The technical details of these parameters are listed in Table 1. The prototype of one of the possible designs of the multi-material responsive spacer 10 and its CAD design are shown in FIGS. 8(a)-8(b).

TABLE 1

Design dimensions for the novel spacers fabricated for experimental use

| | Spacer | | | | | |
|---|---|---|---|---|---|---|
| | Primary Structure Parameter | | | | Secondary Structure | |
| | A (mm) | D (mm) | λ (mm) | L (mm) | df (mm) | Lf (mm) | w (mm) |
| Dimension | 1.0-3.0 | 0.4-1.0 | 5.0-40.0 | 4.0-10.0 | 0.4-1.0 | 2.0-4.0 | 3.0-12.0 |

(c) Materials

The primary structure 20 of the spacer 10 serves as the base material unit with rigid components while the secondary structures 30 serve as the soft material unit with flexible components. In some embodiments, the base material unit 20 and the soft material unit 30 may be printed simultaneously into the intended 3D configuration of the spacer 10 by photo-polymerisation of photopolymer. The material units may be acrylic based photopolymer with a wide range of shore hardness under ASTM D2240 type A and type D scales. Type A scales are used for measurement of softer polymers whereas type D scales are for harder polymer. The higher the shore hardness, the harder and more inflexible the materials, as shown in Table 2. Acrylic based photopolymer have a wide range of tensile strength and elongation at break. Tensile strength is used for measurement of the strength of hard polymers whereas elongation at break is used for measurement of the elasticity of soft polymer. The higher the tensile strength, the more rigid and more robust the materials while the larger the percentage of elongation at break, the more flexible and more elastic the materials. Different mechanical properties in a single spacer 10 can be achieved by selecting materials of different shore hardness or different tensile strength and elongation at break for the primary structures 20 and secondary 30 structures. Materials that have Shore Hardness in the range of Mat. II, III, IV as shown in Table 2 below (i.e. from 73 to 86) can be used as the rigid primary structure 20 while materials that have Shore Hardness in the range of Mat. I (i.e. 26-28) can be used as the flexible secondary structure 30.

TABLE 2

Shore hardness scale of different materials

| | Shore Hardness Scale | | | | | | | | | | | | | |
|---|---|---|---|---|---|---|---|---|---|---|---|---|---|---|
| | Extra Soft | | | | Soft | | Medium Soft | Medium Hard | | | Hard | | Extra Hard | |
| Type A | 0 | 10 | 20 | 30 | 40 | 50 | 60 | 70 | | 80 | 90 | | 100 | | | |
| Type D | | | | | | | | 0 | 10 | 20 | 30 | 40 | 50 | 60 | 70 | 80 | 90 | 100 |
| Materials | | | 26-28 | | | | | | | 73-77 | | | | | | 74-78 | 83-86 |
| | | | Mat. I | | | | | | | Mat. II | | | | | | Mat. III | Mat. IV |

(d) Surface Chemistry

There are many methods of post-treatment to change the surface chemistry of the spacer 10 such as self-assembly of polyelectrolyte via layer-by-layer method, formation of thin polyamide film via interfacial polymerization method. In addition, traditional coating methods, such as spin coating, dip coating, and spray coating can also be used to coat a thin layer of hydrophilic polymer onto the spacer 10 to reduce the membrane fouling.

Experimental Study—Responsiveness of the Multi-Material Spacer

Figure 10:
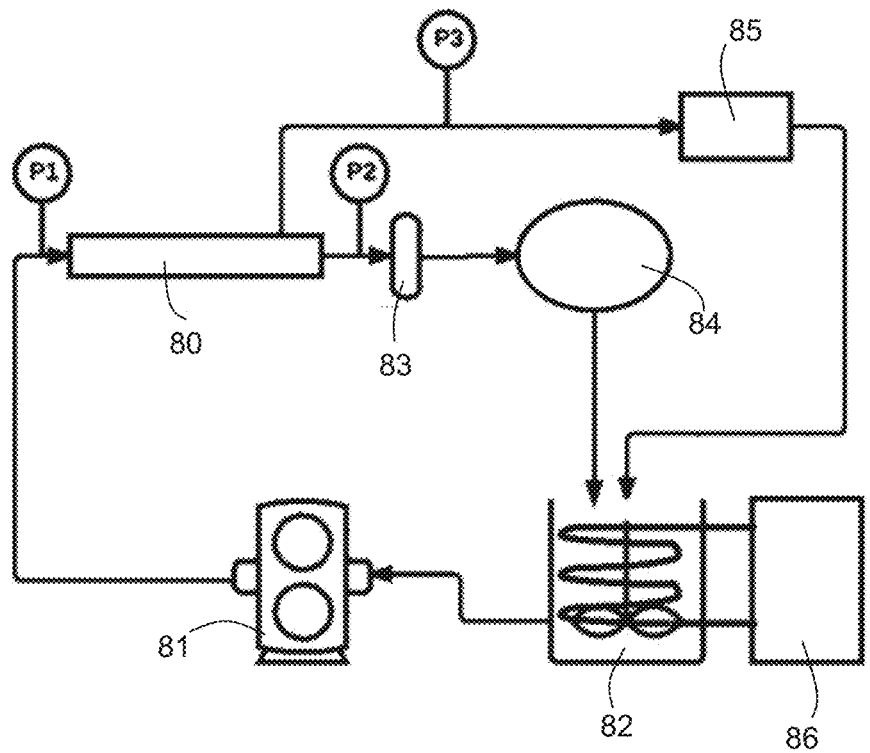
FIG. 10 is a schematic diagram of the cross-flow setup.

Validation tests were conducted on the fabricated spacer 10 to ensure the ability of the secondary structures 30 of the spacer 10 to respond to external stimulus. The external stimulus tested is the hydrodynamic forces of the fluid flow. The multi-material responsive spacer 10 was printed with a length of 278 mm, width of 35 mm, height of 1 mm and placed in a flat channel test cell 80 as shown in FIG. 10. Ultrapure water from Milli-Q systems was circulated at a feed pressure of 100 kPa and varying flow rate from 0 to 1.0 L/min. Under varying flow rate, the secondary structures 30 on the printed spacers 10 can successfully respond by having different angular displacement as seen in FIGS. 9(a)-(e), in which increase in flow rate (direction of flow being from left to right as viewed) from FIGS. 9(a) to 9(e) gave rise to corresponding increase in angular displacement of the secondary structures 30 from a reference axis Y that is perpendicular to the direction of flow.

Experimental Study—Bentonite Fouling Test of the Multi-material Spacer

To compare the effectiveness of the multi-material responsive spacer 10 in reducing membrane fouling, a single material rigid spacer of the same design and a multi-material responsive spacer 10 were both studied under the same experiment conditions.

Ultrafiltration experiments were performed in a flat channel test cell 80 with a channel length of 278 mm, width of 35 mm and height of 2 mm. Koch Systems HFK-131 membranes made of polysulphone with a nominal molecular weight cut off of 5000 Da were used. The active membrane area was 9.73×10$^{-3}$ m$^2$. Supporting inserts of 1 mm thickness were used for adjustments such that the spacer height fitted the channel height. Bentonite (Sigma Co.) at concentrations of 0.1 g/L and 1 g/L were used as the foulant in this study. A peristaltic pump 81 was used to introduce pulsating flow, hence creating fluctuating hydrodynamic forces on the multi-material responsive spacer 10. The schematic diagram of the experiment set up is illustrated in FIG. 10.

The initial water flux of the membrane (not shown) was measured with ultrapure water (Milli-Q System) before the start of each run to act as the baseline comparison. In a typical run, fresh feed solution 82 was circulated at the required flow rate and pressure for 1 hour at a temperature at 24° C. through the cell 80, using a chiller 86 to maintain temperature of the feed solution 82. Feed solution 82 exiting the cell 80 was returned to the feed solution 82 tank through a flow meter 83 and back pressure regulator 84. A mass flow controller 85 was connected in parallel to the flow meter 83 and back pressure regulator 84 between the cell 80 and the feed solution 82 tank. Permeate were collected and weighed to calculate the permeate flux. Pressure sensors P1, P2 and P3 were provided upstream of the cell 80, between the cell 80 and the flow meter 83, and between the cell 80 and the mass flow controller 85 respectively.

Figure 11:
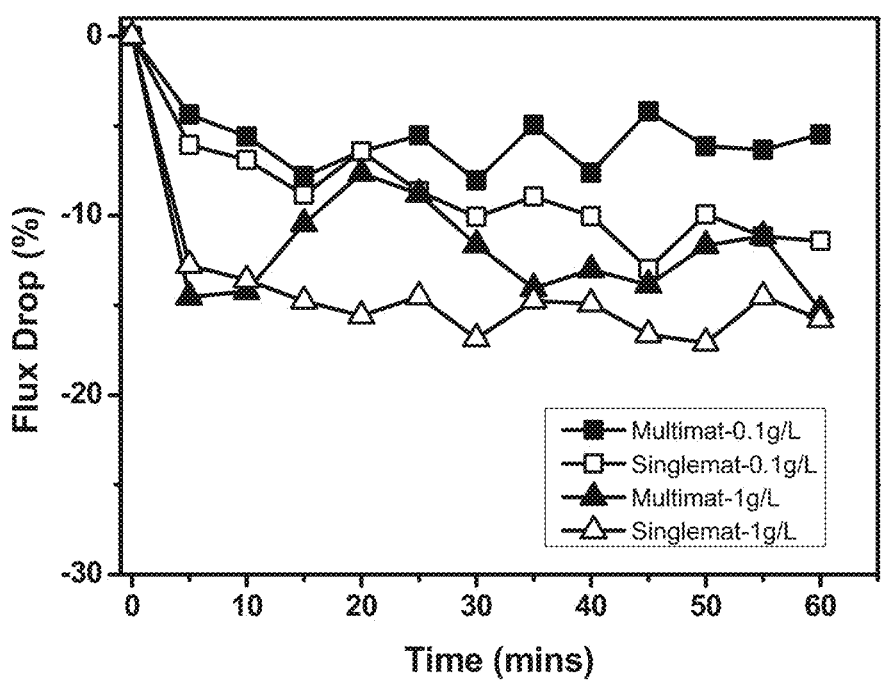
FIG. 11 is a graph showing flux reduction over time due to membrane fouling.

As can be seen in the results shown in FIG. 11, the multi-material responsive spacer 10 was able to achieve lower flux drop due to bentonite fouling when compared to the single rigid material spacer. This indicates that a spacer 10 with flexible filaments 30 has a beneficial effect on fouling reduction. The flexible properties on the selected section 30 of the spacer 10 allows dynamic movement under varying flow rate, which create a "sweeping" effect that disrupt the boundary layers and prevent foulants from accumulating near spacer filaments 30 and on the membrane surface, thereby mitigating fouling. The higher flux reduction of the single material static spacers may be due to localized dead spots with poor mass transfer that initiate fouling. This problem is alleviated with the multimaterial responsive spacer 10 which created a "sweeping effect" using flexible sections 30 of the spacers 10.

The dynamic spacers 10 with various functional structures can be easily tailored and incorporated into a variety of membrane modules; in particular, spiral wound modules that are widely used for a broad spectrum of membrane applications. An example has been described above that demonstrated the application of the spacer 10 with hairy structures 30 to a forward osmosis process, which is an emerging technique for water/wastewater treatment, food processing, and others. Although the introductory case given here is based on a forward osmosis process, the dynamic spacer design can definitely find application in different membrane processes, including but not limited to reverse osmosis, nanofiltration, ultrafiltration, etc., for which the efficiency is limited to a great extent by concentration polarization and fouling. It is expected that spacers 10 with dynamic structures will catalyze the application of membrane technology.

This present spacer 10 addresses two important unmet needs of spacers in a spiral wound module, which is to maximize mass transfer while minimizing pressure drop and reducing concentration polarization and membrane fouling in reverse osmosis technology. The manufacturability/scalability of the spacer 10 disclosed herein is very high and it is very easy to scale up the spacer 10 for mass production.

This application discloses a spacer 10 for a membrane module comprising a plurality of first filaments 20 which form a plurality of fluid flow channels; and a plurality of second filaments 30 which are coupled to the first filaments 20; wherein the second filaments 30 are movable with respect to the first filaments 20 in response to an external stimulus, such that the micro-hydrodynamic performance in the fluid flow channels is improved.

In some embodiments, the second filament 30 may be responsive to the external stimulus, including but not limited to, hydrodynamic forces, electric field or magnetic field.

In alternative embodiment, the second filament 30 may comprise a rod-like structure or a vortex generator-like structure.

The rod-like structure 30 may have a cross-sectional shape that is circular, elliptical, rectangular or helical.

The first filaments 20 are preferably formed by a hard material and the second filaments 30 are preferably formed by a soft material.

The fluid flow channels defined by the first filaments may be shaped in tortuous patterns, including but not limited to, sinusoidal patterns and zigzag patterns.

The first 20 and second 30 filaments may be fabricated in a single manufacturing process, including but not limited to, three dimensional (3D) printing.

The spacer 10 can be used in flat sheet based membrane modules, including but not limited to, spiral wound membrane module, plate and frame module and submerged flat sheet.

Whilst there has been described in the foregoing description exemplary embodiments of the present invention, it will be understood by those skilled in the technology concerned that many variations and combination in details of design, construction and/or operation may be made without departing from the present invention. For example, the following modifications may be made to further improve the performance of the current design of the dynamic spacer 10:

Modification of the response mechanisms of the dynamic elements 30. The active response of the dynamic elements 30 will be realized by applying magnetic material to the hairy structures 30, e.g., a magnetic bead onto the tip of the fibers 31. It is expected that controllable movement of the fibers 30 will be possible when applying an alternating electric field to the channel.

Modification of the fabrication methods of the dynamic elements 30. The geometry and material of the current design are limited by the fabrication method. Novel methods will make it possible to fabricate the dynamic elements 30 with more complex geometry and better elastic properties, so that different types of asymmetrical filaments besides those having a bulbous free end may be provided. A potential method is the use of 3D printing, which is an emerging technique for fabricating objects in terms of a digital design.

Modification of the framework 20 for the hairy structures 30. The framework 20 can comprise various filament networks (similar to conventional spacer networks or novel network structures) that can synergistically work with the hairy structures 30. The wake effects and the vortexes induced by the network 20 might dramatically increase the interactions between the flexible fibers 30 and fluid.

Modification of the orientations and patterns of the fiber array of hair structures 30. The orientation of the hairy structures 30 can be varied to maximize the response to the flowing fluid. Different patterns of the fiber array, e.g., varying the spacing between the hair structures 30 and the way of clustering and separating the hair structures 30, could intensify or weaken the fiber-fluid interactions owing to wake effects.

Optimization of the mechanical properties of the hairy structures 30. This investigation will mainly focus on choosing better materials for fabricating the fibers 30. For example, it is of great value to determine an optimal elastic modulus for the fiber structures 30 that can maximize the interplay between the fibers 30 and fluid.

Modification of the asymmetric structure 32. The asymmetry of the fibers 32 was realized by applying a solid bead 39 to the tip of the uniform fiber 31 in the current design. The asymmetric part (not shown) can comprise more complicated substructures, such as a spiral end, which are expected to further enhance the response of the fibers 30 to the fluid movement. The advancement of 3D printing will be beneficial to the fabrication of these subtle designs.

Optimization of the structure for reducing pressure loss. Direct evidence showing the effect of the dynamic structure on pressure loss in a membrane module has not been provided in the current study. Such an effect will be validated and optimized when a larger prototype is fabricated and incorporated into a membrane module for a pilot-scale filtration test.

REFERENCES

1. Koutsou, c. P., S. G. Yiantsios, and A J. Karabelas, Numerical simulation of the flow in a plane channel containing a periodic array of cylindrical turbulence promoters. Journal of Membrane Science, 2004. 231(1-2): p. 81-90.
2. Schwinge, J., et al., Spiral wound modules and spacers: Review and analysis. Journal of Membrane Science, 2004. 242(1-2): p. 129-153.
3. Dacosta, A. R., A. G. Fane, and D. E Wiley, Spacer characterization and pressure drop modelling in spacer-filled channels for ultrafiltration. Journal of Membrane Science, 1994. 87(I-2): p. 7998.
4. Schock, G. and A Miguel, Mass-transfer and pressure loss in spiral wound modules. Desalination, 1987.64: p. 339-352.
5. Zimmerer, C. C. and V. Kottke, Effects of spacer geometry on pressure drop, mass transfer, mixing behavior, and residence time distribution. Desalination, 1996. 104(1-2): p. 129-134.
6. Willems, P., et al., Use of Particle Imaging Velocimetry to measure liquid velocity profiles in liquid and liquid/gas flows through spacer filled channels. Journal of Membrane Science, 20 I O. 362(1-2): p. 143-153.
7. Gao, Y., et al., Characterization of fluid dynamics in spacer-filled channels for membrane filtration using Doppler optical coherence tomography. Journal of Membrane Science, 2013. 448(0): p. 198-208.
8. Karode, S. K. and A. Kumar, Feed spacers for filtration membrane modules. 2006, Google Patents.
9. Guillen, G. and E M. V. Hoek, Modeling the impacts of feed spacer geometry on reverse osmosis and nanofiltration processes. Chemical Engineering Journal, 2009. 149 (1~3): p. 221-231.
10. Kidwell, A. J., Membrane filtration using low energy feed spacer. 2013, Google Patents.
11. Johnson, J. E, Spiral wound element with improved feed space. 2005, Google Patents.
12. Dewan, A, et al., Review of passive heat transfer augmentation techniques. Proceedings of the Institution of Mechanical Engineers Part a-Journal of Power and Energy, 2004. 218(A7): p. 509527.
13. Eiamsa-Ard, S. and P. Promvonge, Enhancement of heat transfer in a tube with regularly-spaced helical tape swirl generators. Solar Energy, 2005. 78(4): p. 483-494.
14. Schwinge, J., D. E Wiley, and A G. Fane, Novel spacer design improves observed flux. Journal of Membrane Science, 2004. 229 (1-2): p. 53-61.
15. Balster, J., et al., Multi-layer spacer geometries with improved mass transport. Journal of Membrane Science, 2006. 282(1-2): p. 351-361.
16. Li, F., et al., Novel spacers for mass transfer enhancement in membrane separations. Journal of Membrane Science, 2005. 253(1-2): p. 1-12.
17. Amokrane, M., et al., New spacer designs for the performance improvement of the zigzag spacer configuration ill spiral-wound membrane modules. Desalination and Water Treatment, 2015.
18. Fimbres-Weihs, G. A., D. E. Wiley, and D. F. Fletcher, Unsteady flows with mass transfer in narrow zigzag spacer-filled channels: A numerical study. Industrial and Engineering Chemistry Research, 2006. 45(19): p. 6594-6603.
19. Xie, P., L. c. Murdoch, and D. A. Ladner, Hydrodynamics of sinusoidal spacers for improved reverse osmosis performance. Journal of Membrane Science. 2014. 453 (0): p. 92-99.
20. Alben, S., M. Shelley, and 1. Zhang, Drag reduction through self-similar bending of a flexible body. Nature, 2002. 420(6915): p. 479-481.
21. Steinberg, Y., Hydrodynamics—Bend and survive. Nature, 2002. 420(6915): p. 473-473.
22. Shelley, M J. and J. Zhang, Flapping and Bending Bodies Interacting with Fluid Flows, in Annual Review of Fluid Mechanics, 110143, S. H. Davis alld P. Moin, Editors. 2011. p. 449-465.
23. Zhu, L. D., Viscous flow past a flexible fibre tethered at its centre point: vortex shedding. Journal of Fluid Mechanics, 2007.587: p. 217-234.
24. Zhu, L. D., Interaction of two tandem deformable bodies in a viscous incompressible flow. Journal of Fluid Mechanics, 2009. 635: p. 455-475.
25. Zhu, L. D. and C. S. Peskin, Drag of a flexible fiber in a 2D moving viscous fluid. Computers & Fluids, 2007. 36(2): p. 398-406.
26. Taherzadeh, D., C. Picioreanu, and H. Horn, Mass Transfer Enhancement in Moving Biofilm Structures. Biophysical Journal, 2012. 102(7): p. 1483-1492.
27. Taherzadeh, D., et al., Computational Study of the Drag and Oscillatory Movement of Biofilm Streamers in Fast Flows. Biotechnology and Bioengineering, 2010.105(3): p. 600-610.
28. S. Sawada and M. Shishido, "Spiral wound type membrane module," ed: Google Patents, 1989.
29. J. Schwinge, D. E. Wiley, A. G. Fane, and R. Guenther, "Characterization of a zigzag spacer for ultrafiltration," Journal of Membrane Science, vol. 172, pp. 19-31, 2000.
30. J. F. Hester, B. E. Spiewak, P. D. Radovanovic, S. R. Reimann, and R. S. Kody, "Fluid separation membrane module," ed: Google Patents, 2006.
31. K. V. Larsen, "Spacer for Membrane Modules, a Membrane Module and Uses Thereof," ed: Google Patents, 2006.
32. K.-L. Tung, Y.-L. Li, M.-Y. Lu, and J.-Y. Lai, "Feed spacer for spiral-wound membrane module," ed: Google Patents, 2008.
33. P. R. Dontula, Y. Tayalia, and U. J. Bharwada, "Feed spacer for spiral wound membrane element," ed: Google Patents, 2011.

34. S. Chikura, S. Ishihara, M. Hirokawa, and Y. Uda, "Spiral type separation membrane element," ed: Google Patents, 2009.
35. C. Fritzmann, M. Hausmann, M. Wiese, M. Wessling, and T. Melin, "Microstructured spacers for submerged membrane filtration systems," Journal of Membrane Science, vol. 446, pp. 189-200, 2013.
36. C. Fritzmann, M. Wiese, T. Melin, and M. Wessling, "Helically microstructured spacers improve mass transfer and fractionation selectivity in ultrafiltration," Journal of Membrane Science, vol. 463, pp. 41-48, 2014.
37. J. Liu, A. Iranshahi, Y. Lou, and G. Lipscomb, "Static mixing spacers for spiral wound modules," Journal of Membrane Science, vol. 442, pp. 140-148, 2013.
38. A. Shrivastava, S. Kumar, and E. L. Cussler, "Predicting the effect of membrane spacers on mass transfer," Journal of Membrane Science, vol. 323, pp. 247-256, 2008.
39. K. J. Farrell, I. Heat Transfer Research, U. S. B. o. R. W. T. E. R. Team, W. D. Research, and D. Program, Reduced Membrane Fouling Potential by Tailored Fluid/structure Interaction: U.S. Department of the Interior, Bureau of Reclamation, Technical Service Center, Water and Environmental Services Division, 2008.
40. A. L. Ahmad, K. K. Lau, and M. Z. Abu Bakar, "Impact of different spacer filament geometries on concentration polarization control in narrow membrane channel," Journal of Membrane Science, vol. 262, pp. 138-152, 2005.
41. V. V. Ranade and A. Kumar, "Fluid dynamics of spacer filled rectangular and curvilinear channels," Journal of membrane science, vol. 271, pp. 1-15, 2006.
42. A. Siddiqui, N. Farhat, S. S. Bucs, R. V. Linares, C. Picioreanu, J. C. Kruithof, et al., "Development and characterization of 3D-printed feed spacers for spiral wound membrane systems," Water research, vol. 91, pp. 55-67, 2016.
43. W. Li, K. K. Chen, Y.-N. Wang, W. B. Krantz, A. G. Fane, and C. Y. Tang, "A conceptual design of spacers with hairy structures for membrane processes," Journal of Membrane Science, vol. 510, pp. 314-325, Jul. 15, 2016.
44. K. Kim, W. Zhu, X. Qu, C. Aaronson, W. R. McCall, S. Chen, et al., "3D Optical Printing of Piezoelectric Nanoparticle-Polymer Composite Materials," ACS Nano, vol. 8, pp. 9799-9806, 2014 Oct. 28, 2014.
45. A. R. Schultz, P. M. Lambert, N. A. Chartrain, D. M. Ruohoniemi, Z. Zhang, C. Jangu, et al., "3D Printing Phosphonium Ionic Liquid Networks with Mask Projection Microstereolithography," ACS Macro Letters, vol. 3, pp. 1205-1209, 2014 Nov. 18, 2014.

The invention claimed is:

1. A spacer for a membrane module, the spacer comprising:
   a plurality of first filaments defining a plurality of fluid flow channels, in use the plurality of fluid flow channels being adjacent a membrane of the membrane module; and
   a plurality of second filaments provided on the plurality of first filaments and extending into the fluid flow channels, the second filaments moveable relative to the first filaments in response to an external stimulus during flow of fluid in the fluid flow channels.

2. The spacer of claim 1, wherein the first filaments are made of a material of greater shore hardness than the second filaments.

3. The spacer of claim 1, wherein the first filaments are made of a material of greater tensile strength than the second filaments.

4. The spacer of claim 1, wherein the second filaments are made of a material of greater percentage of elongation at break than the first filaments.

5. The spacer of claim 1, wherein at least a portion of the plurality of second filaments comprise a magnetic material and the external stimulus comprises a magnetic field.

6. The spacer of claim 1, wherein at least a portion of the plurality of second filaments comprise a piezoelectric material and the external stimulus comprises an electric field.

7. The spacer of claim 1, wherein at least a portion of the plurality of second filaments comprise a photolabile conductive polymer and the external stimulus comprises an electric field.

8. The spacer of claim 1, wherein at least a portion of the plurality of second filaments comprise rod-like structures.

9. The spacer of claim 1, wherein at least a portion of the plurality of second filaments comprise vortex generating structures.

10. The spacer of claim 1, wherein at least a portion of the plurality of second filaments have a cross-sectional shape selected from the group consisting of: circular, elliptical, rectangular and helical.

11. The spacer of claim 1, wherein at least a portion of the plurality of second filaments comprise asymmetrical filaments.

12. The spacer of claim 11, wherein the asymmetrical filaments each comprise a length of filament having a bulbous free end.

13. The spacer of claim 12, wherein the bulbous free end comprises a magnetic bead.

14. The spacer of claim 1, wherein at least a portion of the plurality of fluid flow channels have a pattern selected from the group consisting of: sinusoidal and zigzag.

15. The spacer of claim 1, wherein the plurality of second filaments are integral with the plurality of first filaments.

16. The spacer of claim 1, wherein the plurality of first filaments and the plurality of second filaments are provided in an array of unit cells, each unit cell comprising a number of the first filaments having a number of the second filaments provided thereon.

17. The spacer of claim 16, further comprising bridging filaments connecting adjacent unit cells.

18. The spacer of claim 1, wherein the spacer is 3D printed.

19. A membrane module comprising the spacer of claim 1, the spacer provided adjacent a membrane of the membrane module.

20. The membrane module of claim 19, wherein the membrane module is selected from the group consisting of: spiral wound membrane module, plate and frame module and submerged flat sheet module.

* * * * *